(12) United States Patent
Garcia

(10) Patent No.: US 10,053,177 B2
(45) Date of Patent: Aug. 21, 2018

(54) SYSTEM AND METHODOLOGY THAT FACILITATES SADDLEBAG ADJUSTMENTS FOR MOTORCYCLES

(71) Applicant: Lawrence Garcia, Fresno, CA (US)

(72) Inventor: Lawrence Garcia, Fresno, CA (US)

( * ) Notice: Subject to any disclaimer, the term of this patent is extended or adjusted under 35 U.S.C. 154(b) by 138 days.

(21) Appl. No.: 15/287,594

(22) Filed: Oct. 6, 2016

(65) Prior Publication Data

US 2018/0099717 A1    Apr. 12, 2018

(51) Int. Cl.
| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B62J 99/00* | (2009.01) | |
| *B62J 9/00* | (2006.01) | |
| *B62J 7/02* | (2006.01) | |
| *B60R 9/10* | (2006.01) | |

(52) U.S. Cl.
CPC ............... *B62J 99/00* (2013.01); *B62J 9/001* (2013.01); *B60R 9/10* (2013.01); *B62J 7/02* (2013.01); *B62J 9/006* (2013.01); *B62J 2099/002* (2013.01); *B62J 2099/004* (2013.01)

(58) Field of Classification Search
CPC ............ B62J 2099/002; B62J 2099/004; B62J 9/001; B62J 99/00; B62J 7/02; B62J 9/006; B60R 9/10
See application file for complete search history.

*Primary Examiner* — Adam D Tissot
*Assistant Examiner* — Aaron C Smith
(74) *Attorney, Agent, or Firm* — Loza & Loza, LLP; Daniel Castro

(57) ABSTRACT

A motorcycle is disclosed, which includes which includes a first and second saddlebag, a monitoring unit configured to monitor a tilt of the motorcycle, and a bag adjustment unit configured to lift the saddlebags when the tilt of the motorcycle exceeds a tilt threshold. A method and computer-readable storage medium are also disclosed, which facilitate various acts. These acts include facilitating a communication between a remote unit and the motorcycle, and controlling an aspect of at least one of the monitoring unit or the bag adjustment unit via the communication.

20 Claims, 22 Drawing Sheets

US 10,053,177 B2

SYSTEM AND METHODOLOGY THAT FACILITATES SADDLEBAG ADJUSTMENTS FOR MOTORCYCLES

TECHNICAL FIELD

The subject disclosure generally relates to motorcycle saddlebags, and more specifically to a system and methodology that facilitates saddlebag adjustments for motorcycles.

BACKGROUND

Motorcycles are often equipped with saddlebags so that riders may store items while traveling. Hard shell saddlebags are particularly desirable for riders requiring more space and/or security for their items. For riders wanting motorcycles with a lower profile, larger hard shell saddlebags are often used, wherein the clearance from the ground is minimized. With a smaller clearance, however, the degree to which a rider may lean into a turn is compromised. Namely, with saddlebags already near the ground, the bottom of a saddlebag may scrape on the road as the rider leans into a turn. Notwithstanding the saddlebag damage that may result, such scraping also poses a significant safety risk to the rider.

Accordingly, it would be desirable to provide a system and method which overcomes these limitations. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with saddlebag adjustments for motorcycles. In one such aspect, a motorcycle is provided, which includes a first saddlebag on a first side of the motorcycle, and a second saddlebag on a second side of the motorcycle. The motorcycle also includes a monitoring unit configured to monitor a tilt of the motorcycle to the first side, and further configured to monitor a tilt of the motorcycle to the second side. A bag adjustment unit is then configured to lift the first saddlebag when the tilt of the motorcycle to the first side exceeds a tilt threshold, and further configured to lift the second saddlebag when the tilt of the motorcycle to the second side exceeds the tilt threshold.

In another aspect, a computer-readable storage medium is provided, which includes a memory component configured to store computer-readable instructions. The computer-readable instructions include instructions for performing various acts, which include facilitating a communication between a remote unit and a motorcycle, and controlling an aspect of at least one of the monitoring unit or the bag adjustment unit via the communication. For this embodiment, the motorcycle includes a first saddlebag on a first side of the motorcycle, and a second saddlebag on a second side of the motorcycle. The motorcycle also includes a monitoring unit configured to monitor a tilt of the motorcycle to the first side, and further configured to monitor a tilt of the motorcycle to the second side. A bag adjustment unit is then configured to lift the first saddlebag when the tilt of the motorcycle to the first side exceeds a tilt threshold, and further configured to lift the second saddlebag when the tilt of the motorcycle to the second side exceeds the tilt threshold.

In a further aspect, a method is provided, which includes employing a processor to execute computer executable instructions stored on a computer readable storage medium to implement various acts. These acts include facilitating a communication between a remote unit and a motorcycle, and controlling an aspect of at least one of the monitoring unit or the bag adjustment unit via the communication. For this embodiment, the motorcycle includes a first saddlebag on a first side of the motorcycle, and a second saddlebag on a second side of the motorcycle. The motorcycle also includes a monitoring unit configured to monitor a tilt of the motorcycle to the first side, and further configured to monitor a tilt of the motorcycle to the second side. A bag adjustment unit is then configured to lift the first saddlebag when the tilt of the motorcycle to the first side exceeds a tilt threshold, and further configured to lift the second saddlebag when the tilt of the motorcycle to the second side exceeds the tilt threshold.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

As discussed in the background, it is desirable to provide a system and method which overcomes the various limitations of conventional saddlebags. The embodiments disclosed herein are directed towards overcoming such limitations by providing an automated saddlebag adjustment system. For instance, in a particular embodiment, a saddlebag adjustment system is disclosed, which is configured to automatically raise or lower a motorcycle's saddlebags upon sensing that the motorcycle is tilting to a side.

Exemplary Embodiments

Figure 1:
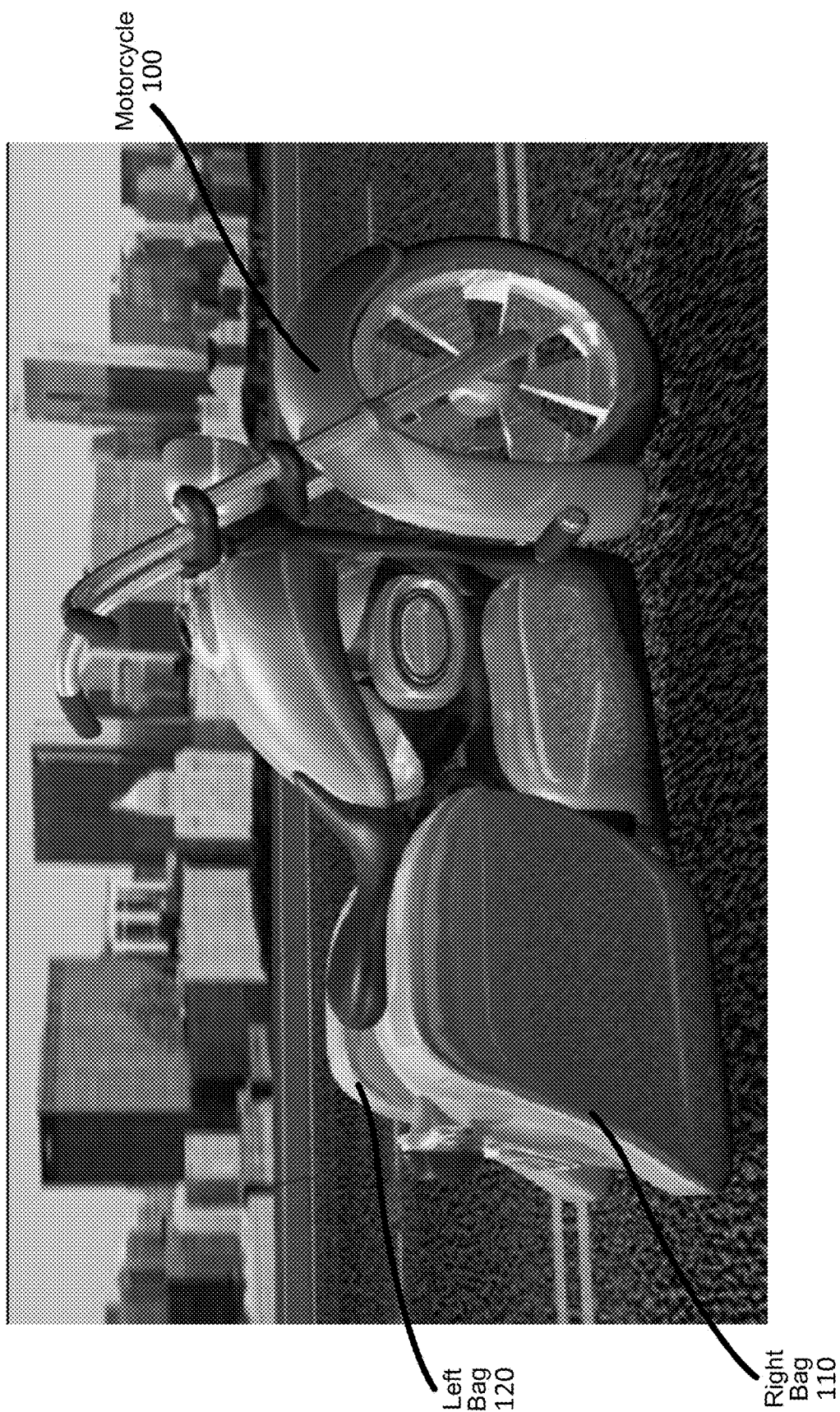
FIG. 1 is a side view of an exemplary motorcycle in accordance with an aspect of the subject specification.
Figure 2:
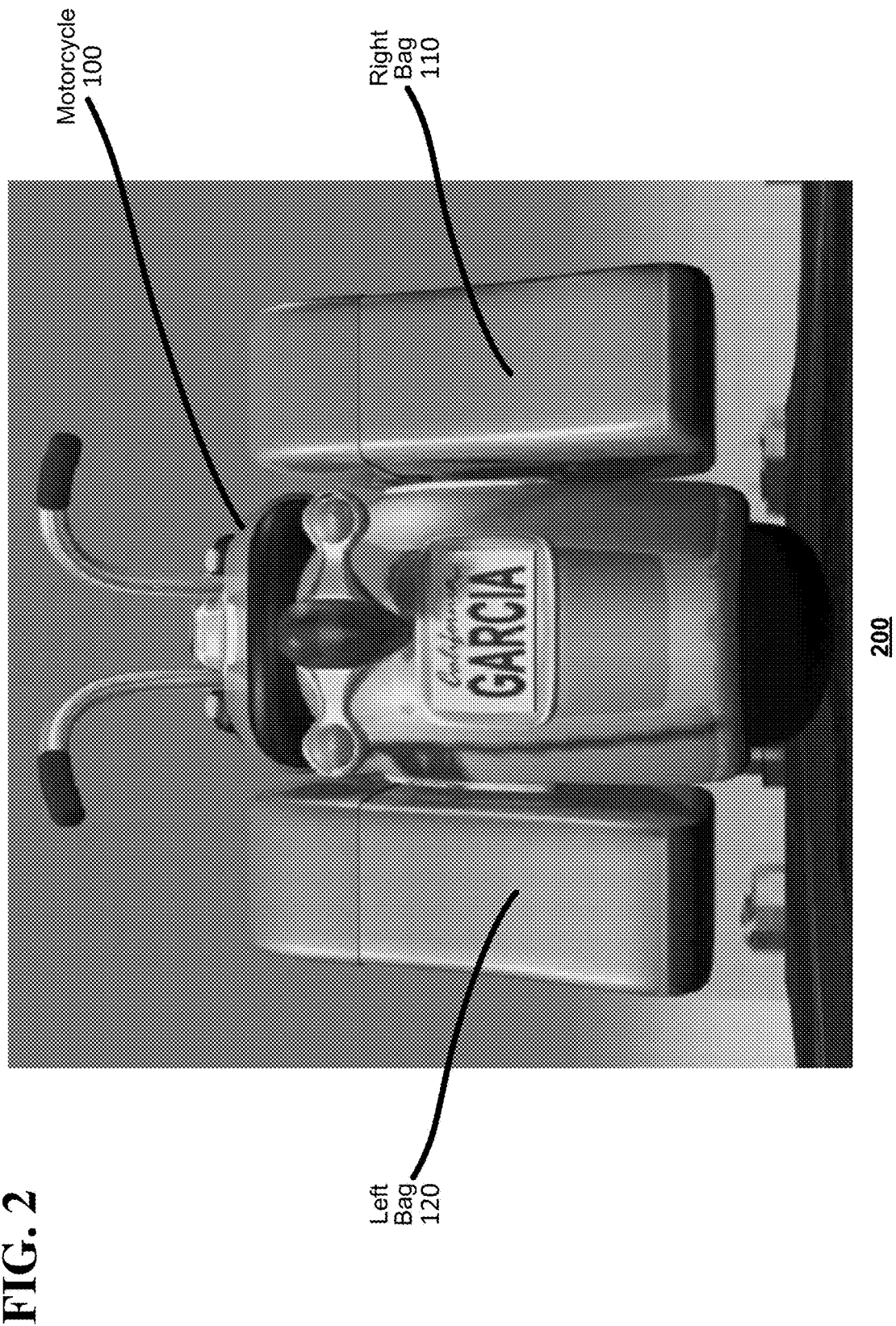
FIG. 2 is a rear view of an exemplary motorcycle in a leveled ride position according to an aspect of the subject specification.
Figure 3:
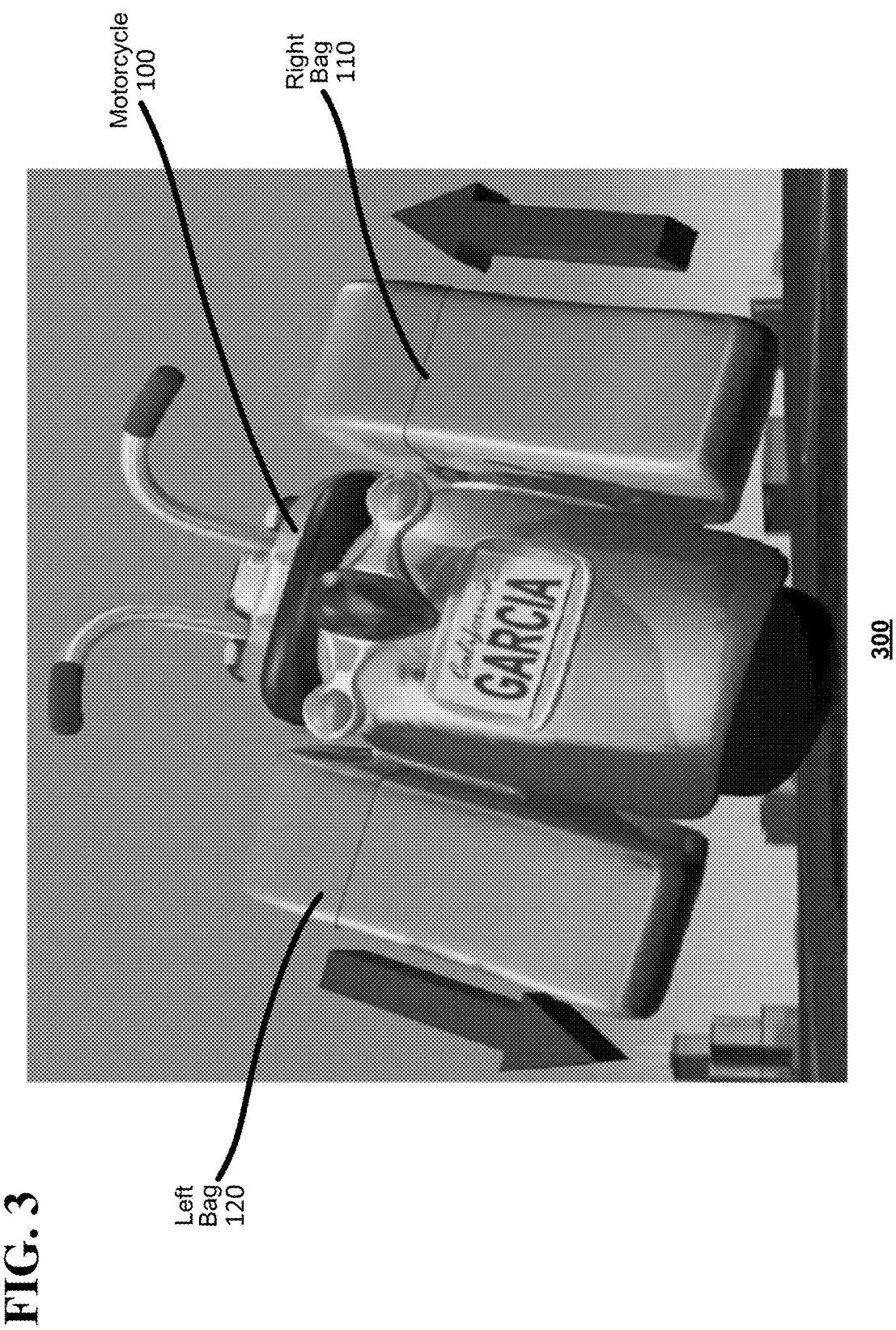
FIG. 3 is a rear view of an exemplary motorcycle leaning to the right in accordance with an aspect of the subject specification.
Figure 4:
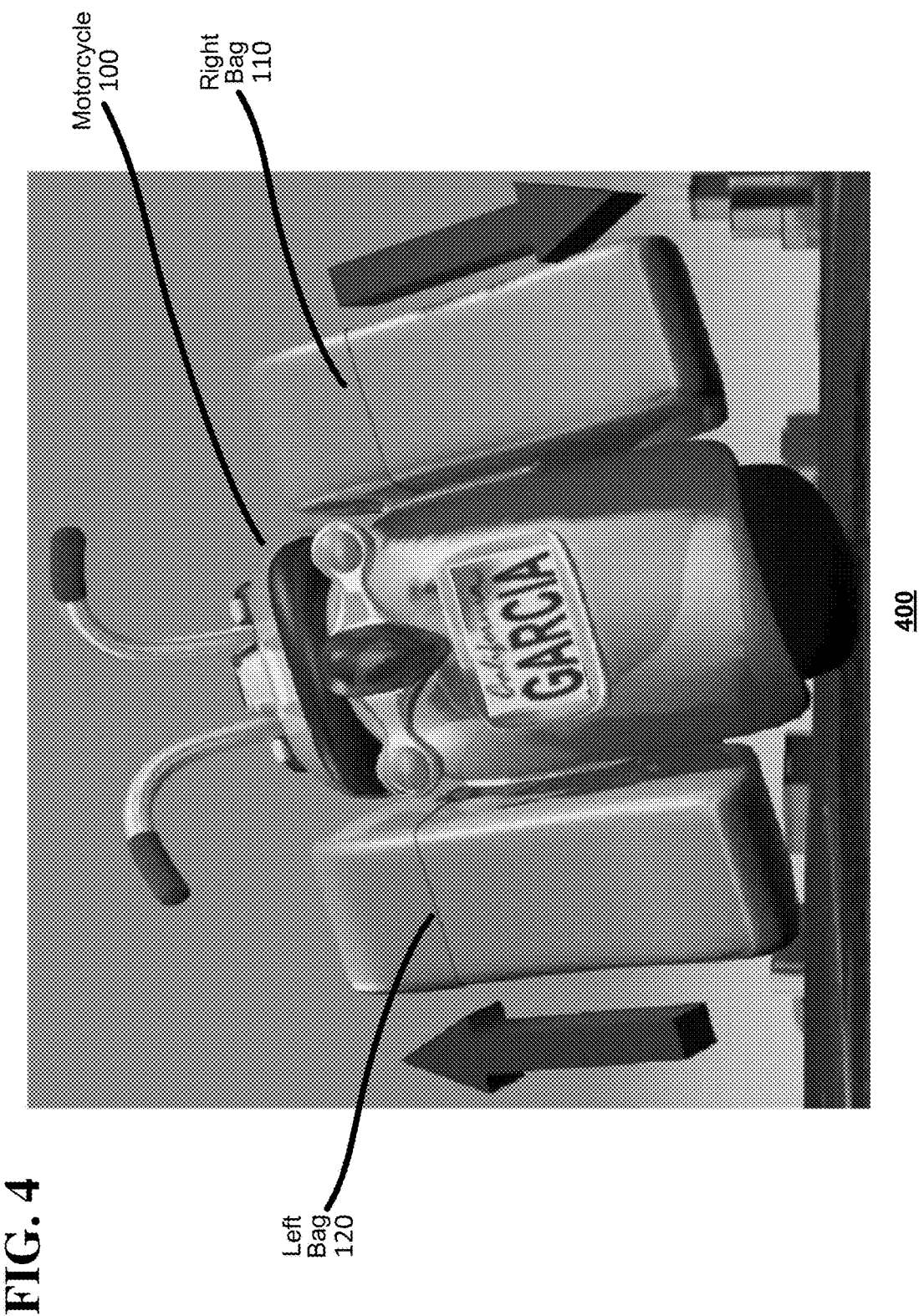
FIG. 4 is a rear view of an exemplary motorcycle leaning to the left in accordance with an aspect of the subject specification.

Turning now to FIGS. 1-5, various views of an exemplary motorcycle in accordance with an aspect of the subject specification are provided. As illustrated, motorcycle 100 generally comprises a right bag 110 and a left bag 120, wherein a side view of motorcycle 100 is provided in FIG. 1 and rear views are provided in FIGS. 2-5. Here, it is contemplated that right bag 110 and left bag 120 are hard shell saddlebags mechanically coupled to either side of motorcycle 100, as shown. During use, right bag 110 and left bag 120 are automatically raised or lowered upon sensing that motorcycle 100 is tilting to a side. For instance, FIG. 2 shows a rear view 200 of motorcycle 100 in a leveled position, whereas FIG. 3 shows a view 300 of right bag 110 in a raised position when motorcycle 100 leans to the right, and FIG. 4 shows a view 400 of left bag 120 in a raised position when motorcycle 100 leans to the left. Within such embodiment, each of right bag 110 and left bag 120 are then configured to automatically lower from a raised position back to an original lowered position as motorcycle 100 returns to a level position. In another embodiment, each of right bag 110 and left bag 120 may be configured to automatically lower from an original lowered position to a further lowered position. For instance, left bag 120 may be configured to further lower from an original lowered position as motorcycle 100 leans to the right, as shown in FIG. 3, and right bag 110 may be similarly configured to automatically lower as motorcycle 100 leans to the left, as shown in FIG. 4.

Figure 5:
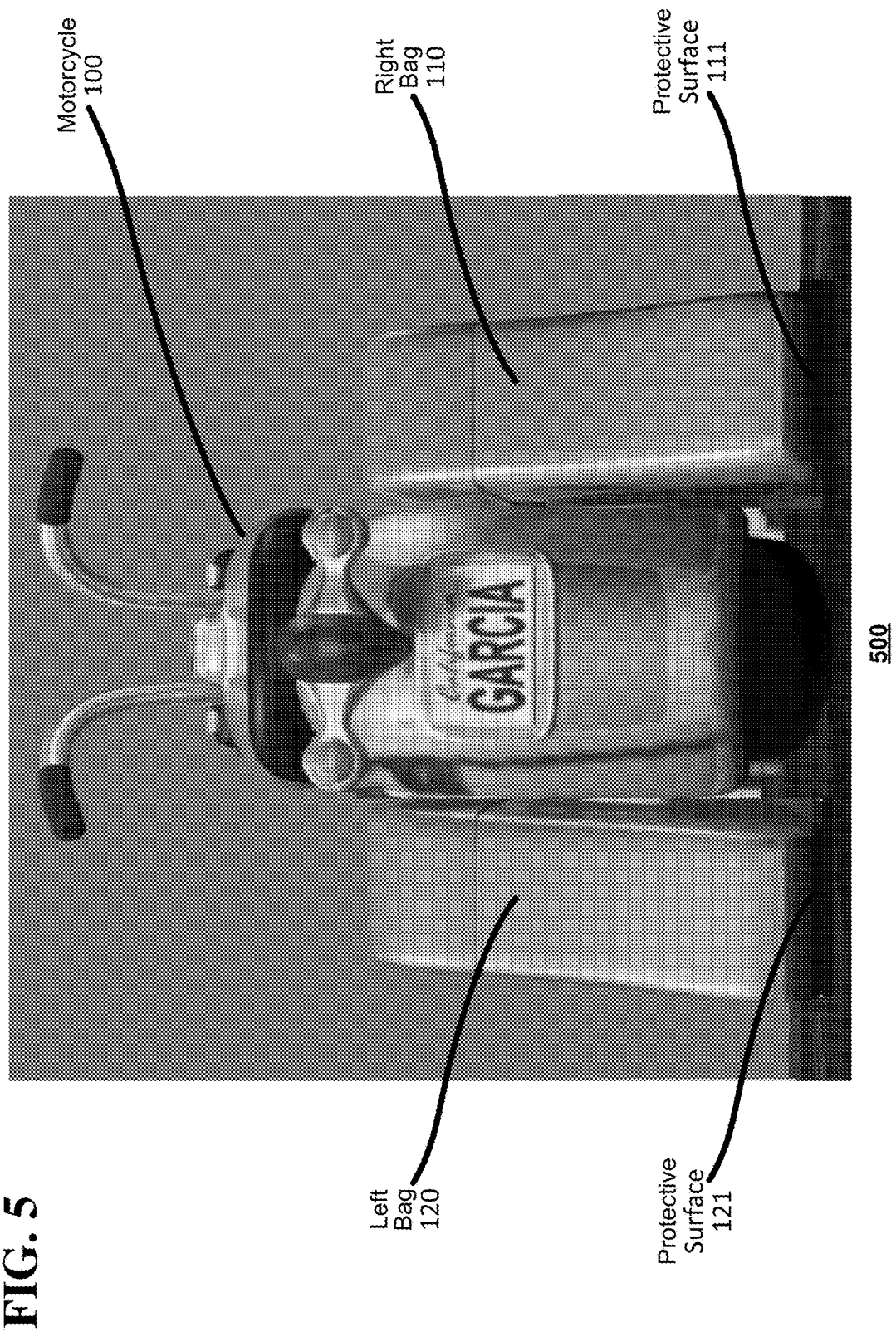
FIG. 5 is a rear view of an exemplary motorcycle in a parked position according to an aspect of the subject specification.
Figure 6:
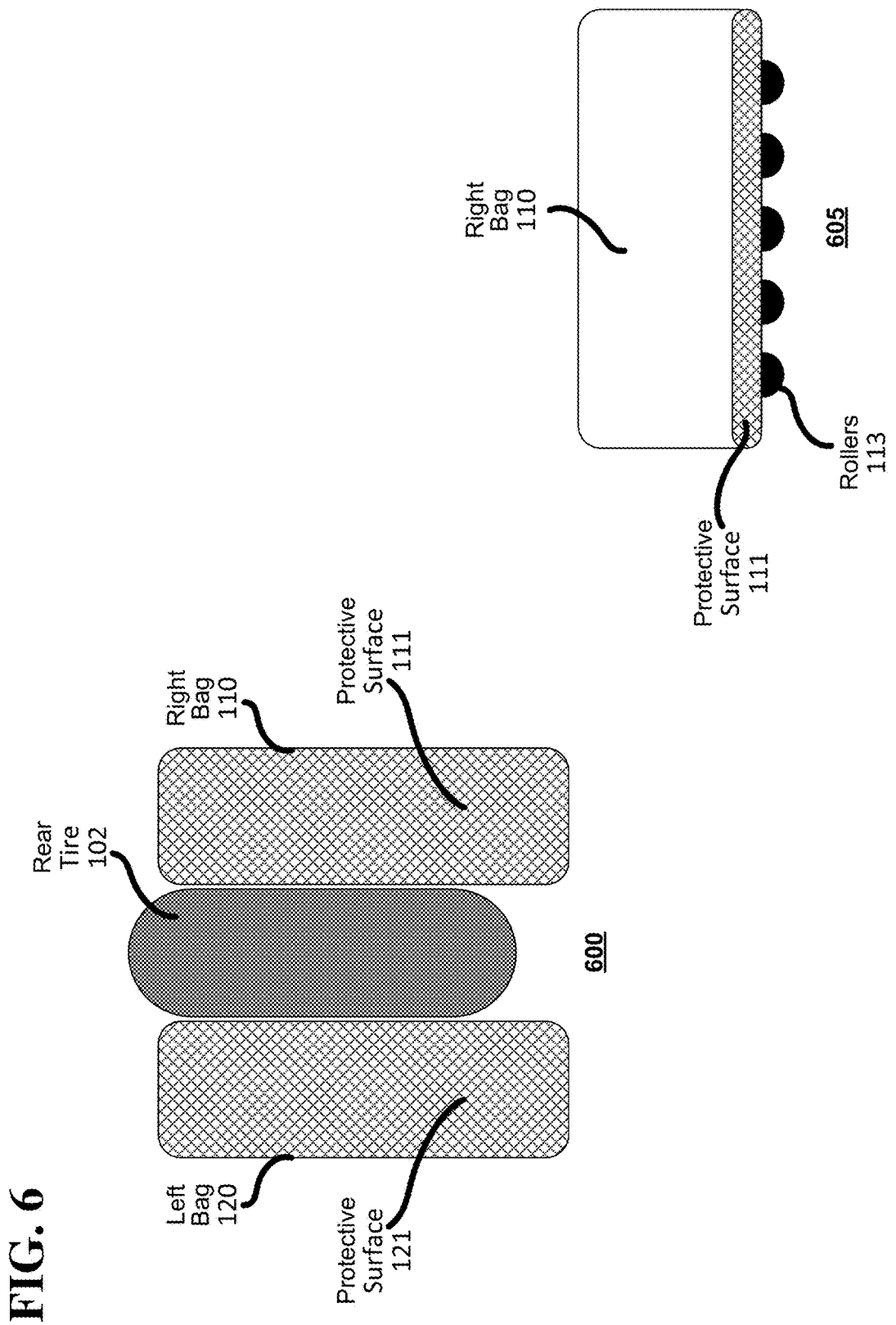
FIG. 6 illustrates saddlebags having exemplary protective surfaces according to an aspect of the subject specification.

In another aspect, it should be appreciated that each of right bag 110 and left bag 120 may be configured to perform the function of a kickstand while motorcycle 100 is not in use. For instance, whereas FIG. 2 illustrates a view 200 of right bag 110 and left bag 120 at an exemplary driving height, FIG. 5 illustrates a view 500 of right bag 110 and left bag 120 in an exemplary parked position in which each of right bag 110 and left bag 120 are fully lowered to the ground. To ensure that right bag 110 and left bag 120 are not damaged while motorcycle 100 is in a parked position, it is further contemplated that the bottoms of right bag 110 and left bag 120 may be lined with protective surfaces 111 and 121, as shown. FIG. 6 provides a bottom view 600 of motorcycle 100, wherein right bag 110 and left bag 120 are shown on either side of rear tire 102. Here, it should be appreciated that material used for protective surfaces 111 and 121 can be any of various types of materials. For instance, rubber may be used to help absorb the impact of making contact with the ground when right bag 110 and left bag 120 are lowered from a driving height to a parked position. Alternatively, in the event right bag 110 and/or left bag 120 inadvertently make contact with the road while motorcycle 100 is driven, other configurations are contemplated. In a first exemplary configuration, material which allows the bottoms of right bag 110 and left bag 120 to safely scrape on the road while motorcycle 100 is driven may be used (e.g., plastic, ceramic, etc.). In a second exemplary configuration, rather than scraping with the road, protective surfaces 111 and 121 can include an array of "rollers" so that right bag 110 and left bag 120 may roll along the road upon making contact. An exemplary side view 605 of right bag 110 configured according to this particular embodiment is provided in FIG. 6, wherein protective surface 111 includes a plurality of rollers 113, as shown.

Figure 7:
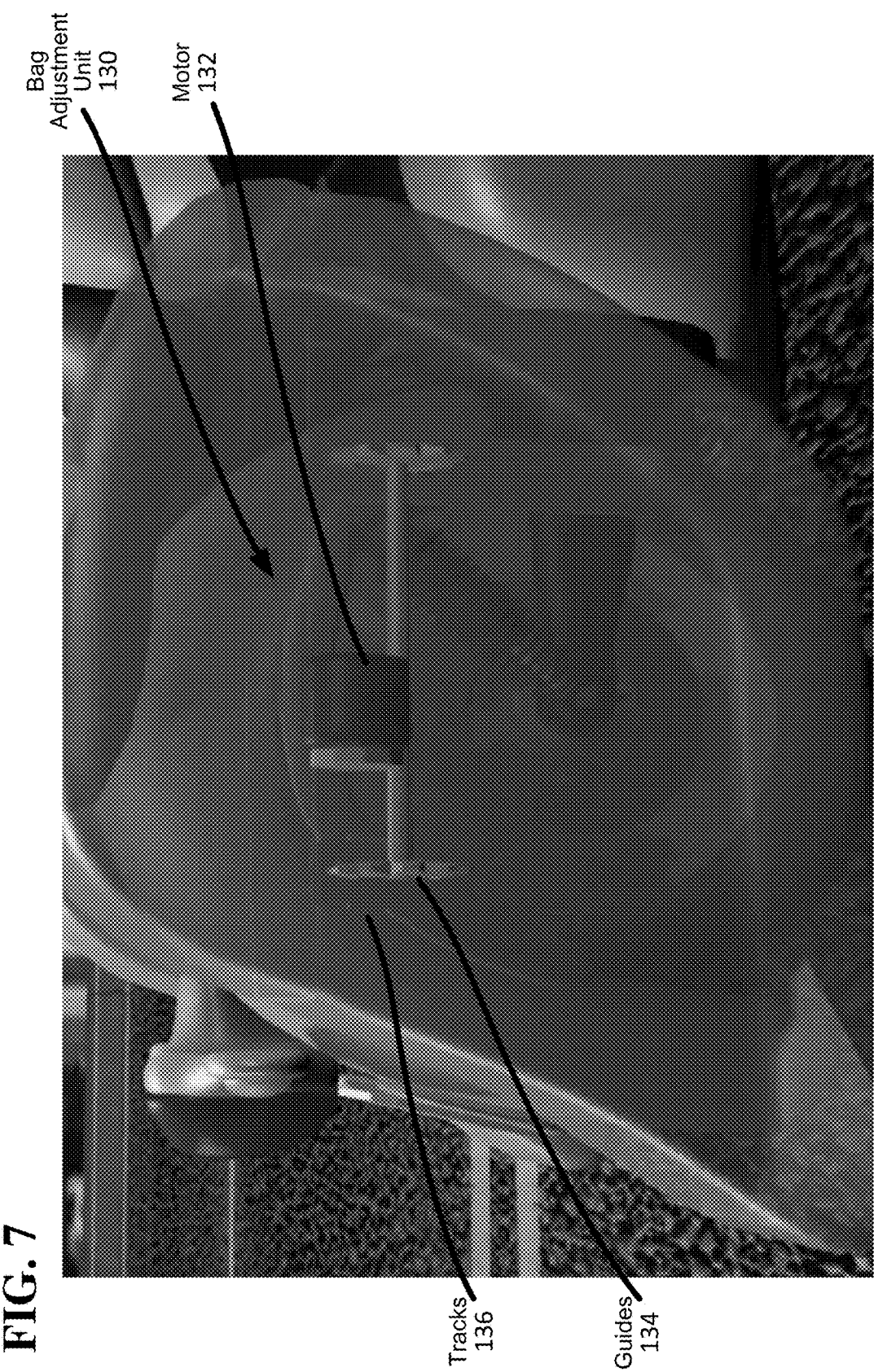
FIG. 7 illustrates an exemplary bag adjustment unit in a raised position according to an aspect of the subject specification.
Figure 8:
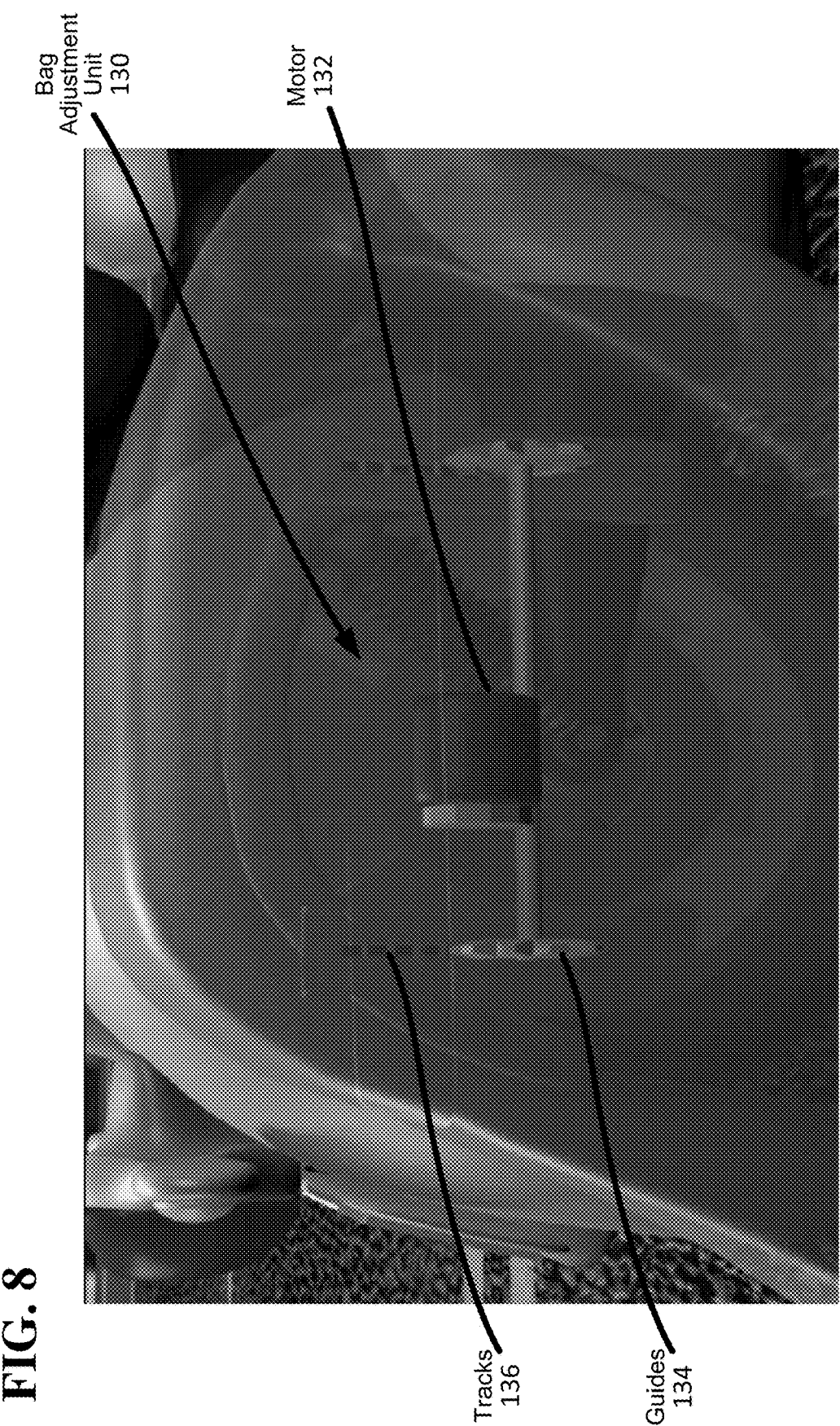
FIG. 8 illustrates an exemplary bag adjustment unit in a lowered position according to an aspect of the subject specification.

In another aspect, it should be appreciated that any of various mechanisms may be utilized to raise/lower right bag 110 and left bag 120. For instance, an exemplary bag adjustment unit is illustrated in FIGS. 7-8, wherein FIG. 7 illustrates bag adjustment unit 130 in a raised position, whereas FIG. 8 illustrates bag adjustment unit 130 in a lowered position. For this particular embodiment, bag adjustment unit 130 is a motorized apparatus comprising a motor 130 configured to raise/lower a motorcycle's saddlebags by raising/lowering bag guides 134 on bag lift tracks 136, as shown. Here, it is contemplated that bag adjustment unit 130 is configured to lift the weight of right bag 110 or left bag 120 and their respective contents therein (e.g., 15 lbs-45 lbs). To this end, it should be noted that the weight a particular motorcycle can safely handle will vary depending on its corresponding Gross Vehicle Weight Rating (GVWR), wherein GVWR designates the total carrying weight of the motorcycle. Therefore, it is contemplated that a particular bag adjustment unit 130 may be configured to lift loads according to a motorcycle's GVWR relative to its anticipated load (e.g., wet weight of the motorcycle, weight(s) of the rider(s), anticipated luggage weight, etc.).

Figure 9:
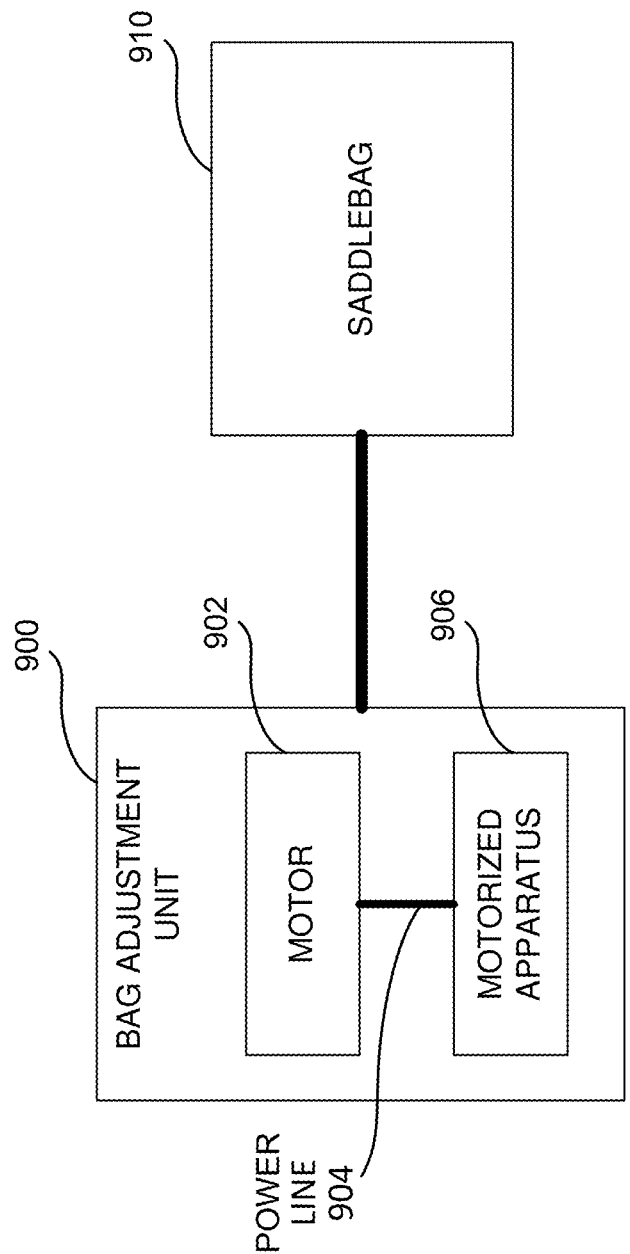
FIG. 9 is a block diagram of a first exemplary bag adjustment unit according to an aspect of the subject specification.

In an exemplary embodiment, although any of various mechanisms may be used, bag adjustment unit 130 comprises components commonly used for power windows, wherein such components are modified according to desired specifications recited herein. For instance, as illustrated in FIG. 9, an exemplary bag adjustment unit 900 is configured to raise/lower a saddlebag 910 using a motorized apparatus 906, wherein motorized apparatus 906 is coupled to motor 902 via power line 904, as shown.

Figure 10:
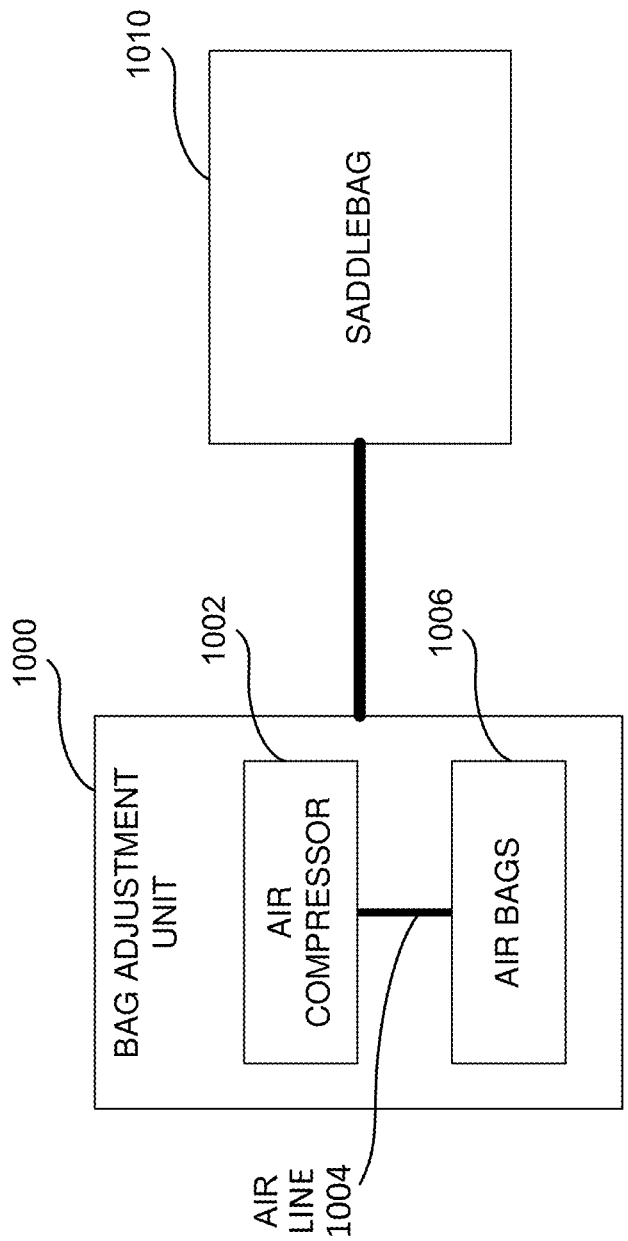
FIG. 10 is a block diagram of a second exemplary bag adjustment unit according to an aspect of the subject specification.

In a further aspect, it is contemplated that a rapid lifting of right bag 110 and left bag 120 may be desirable. Indeed, since a rider may lean into a turn rather quickly, a minimal response time for bag adjustment unit 130 would be desirable to avoid having the bottoms of right bag 110 or left bag 120 scrape on the road. Various configurations for minimizing such response time are contemplated. For instance, as illustrated in FIG. 10, an exemplary bag adjustment unit 1000 is configured to raise/lower a saddlebag 1010 using air bags 1006, wherein such air bags 1006 are coupled to an air compressor 1002 via air line 1004, as shown. During use, saddlebag 1010 is raised/lowered as air bags 1006 are inflated/deflated with air according to any of various air mechanisms known in the art. (See e.g., U.S. Pat. No. 6,394,474, which is hereby incorporated by reference in its entirety).

Figure 11:
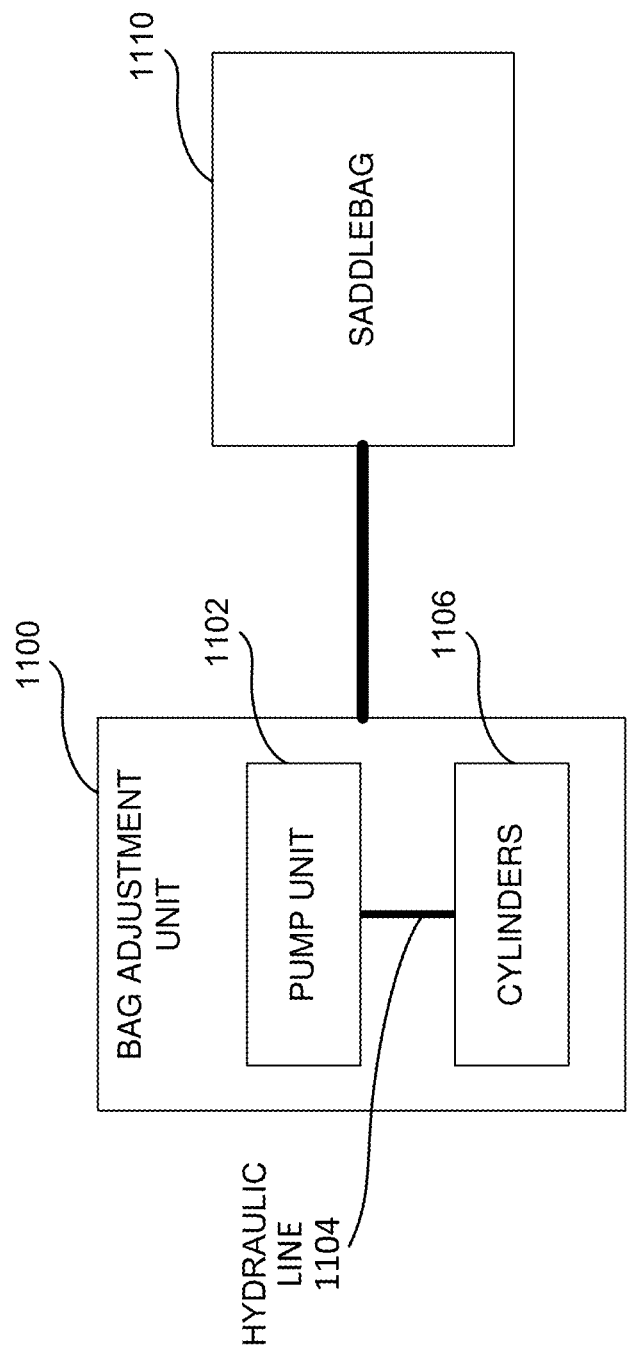
FIG. 11 is a block diagram of a third exemplary bag adjustment unit according to an aspect of the subject specification.

Alternatively, rather than an air-based system, a hydraulic-based system can be used. For instance, as illustrated in FIG. 11, an exemplary bag adjustment unit 1100 is configured to raise/lower a saddlebag 1110 using cylinders 1106, wherein such cylinders 1106 are coupled to a pump unit 1102 via hydraulic line 1104, as shown. During use, saddlebag 1110 is raised/lowered as cylinders 1106 are filled/drained with hydraulic fluid according to any of various hydraulic mechanisms known in the art. (See e.g., U.S. Pat. No. 5,957,252, which is hereby incorporated by reference in its entirety).

Figure 12:
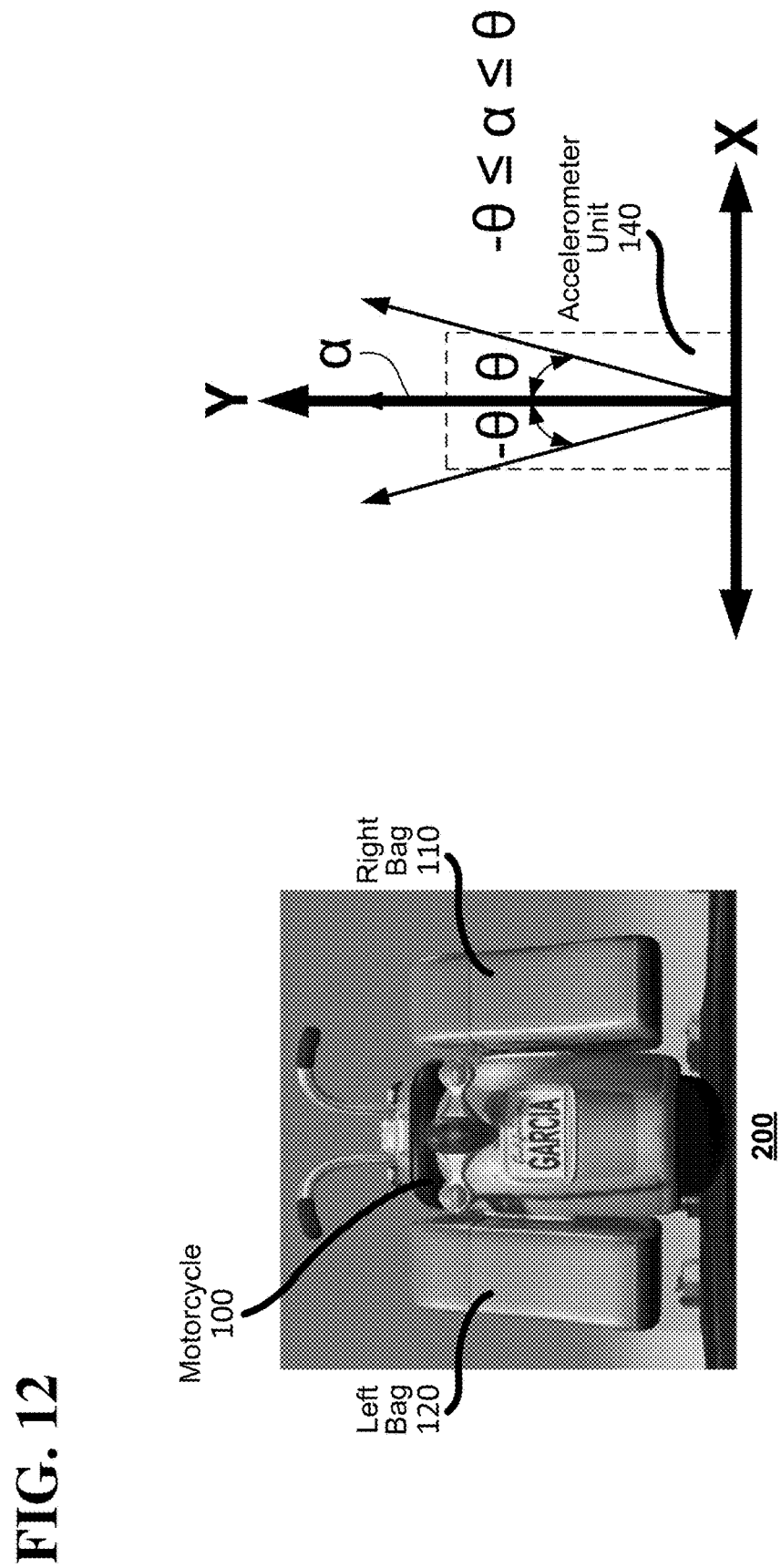
FIG. 12 illustrates an exemplary accelerometer unit of a motorcycle in a leveled position according to an aspect of the subject specification.

Referring back to FIGS. 1-8, in addition to configuring bag adjustment unit 130 with adequate power to lift right bag 110 and left bag 120 within a desired response time (i.e., before right bag 110 or left bag 120 scrape on the road), it is also desirable to configure motorcycle 100 to sense a tilting within the desired response time. To this end, it should be appreciated that any of various mechanisms may be utilized to sense when motorcycle 100 is tilting to a side. In a particular embodiment, tilting is sensed by an accelerometer, such as the exemplary accelerometer unit illustrated in FIGS. 12-14 in which motorcycle 100 is shown in various positions. Here, it is contemplated that accelerometer unit 140 is coupled to motorcycle 100, wherein a tilt angle α of accelerometer unit 140 from the Y-axis is in phase with a tilt angle of motorcycle 100, as shown. In FIG. 12, for instance, a view 200 is provided showing motorcycle 100 in a leveled position according to an aspect of the subject specification. For this particular embodiment, motorcycle 100 is deemed to be in a leveled position, so long as accelerometer unit 140 does not tilt beyond a threshold angle θ to either side (i.e., where −θ≤α≤θ). While in a leveled position, it is contemplated that each of right bag 110 and left bag 120 remain at a desired driving height from the road.

Figure 13:
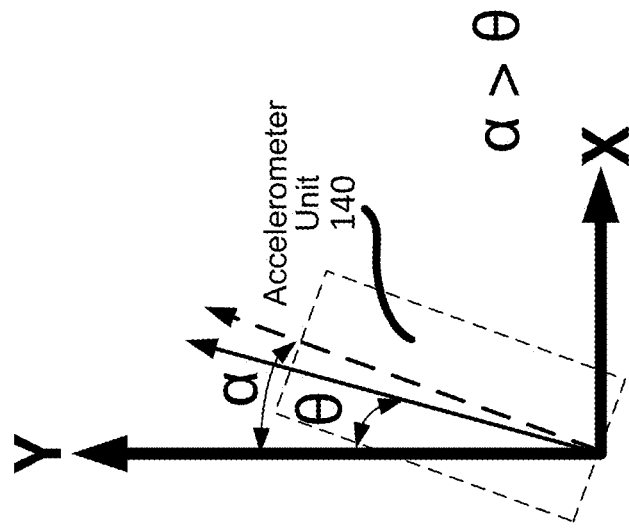
FIG. 13 illustrates an exemplary accelerometer unit of a motorcycle leaning to the right according to an aspect of the subject specification.
Figure 13:
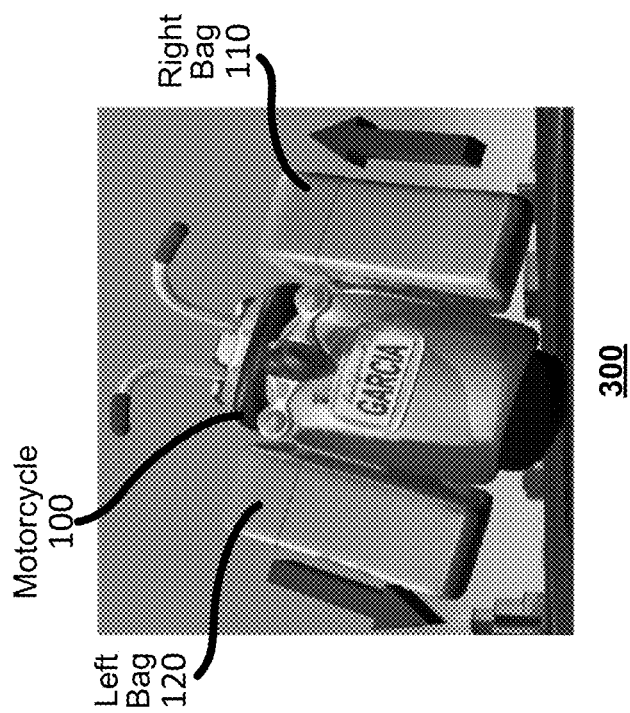
Figure 14:
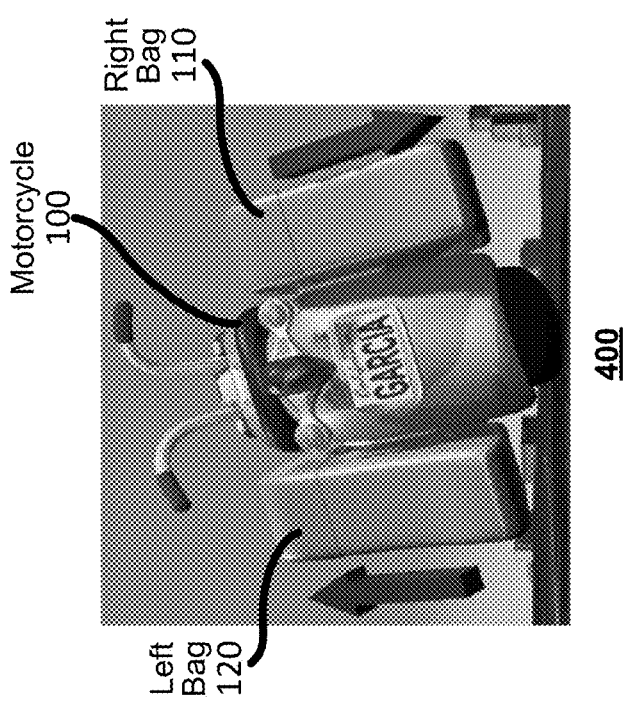
FIG. 14 illustrates an exemplary accelerometer unit of a motorcycle leaning to the left according to an aspect of the subject specification.
Figure 14:
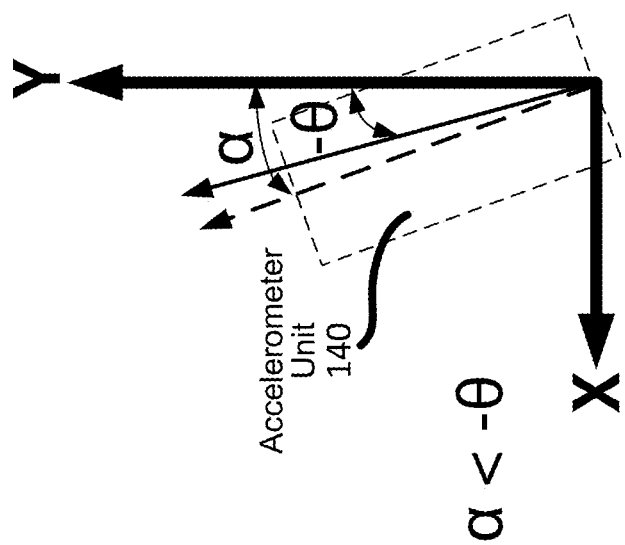

While being driven, it is anticipated that a driver will lean motorcycle 100 into turns. Here, it is contemplated that accelerometer unit 140 will sense such a lean and raise right bag 110 or left bag 120 accordingly. In FIG. 13, for instance, view 300 is provided in which motorcycle 100 leans to the right, wherein right bag 110 is raised in response to accelerometer unit 140 tilting beyond threshold angle θ (i.e., where α>θ). Similarly, FIG. 14 shows view 400 in which motorcycle 100 leans to the left, wherein left bag 120 is raised in response to accelerometer unit 140 tilting beyond threshold angle −θ (i.e., where α<−θ).

Figure 15:
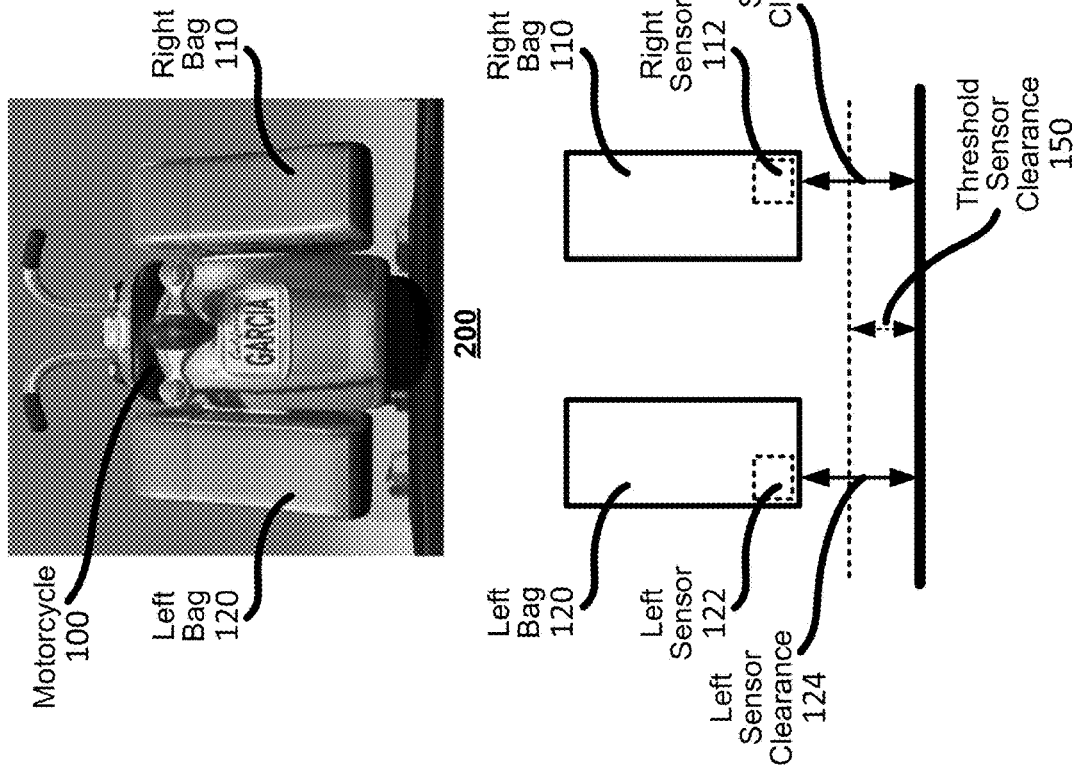
FIG. 15 illustrates exemplary sensor units of a motorcycle in a leveled position according to an aspect of the subject specification.
Figure 16:
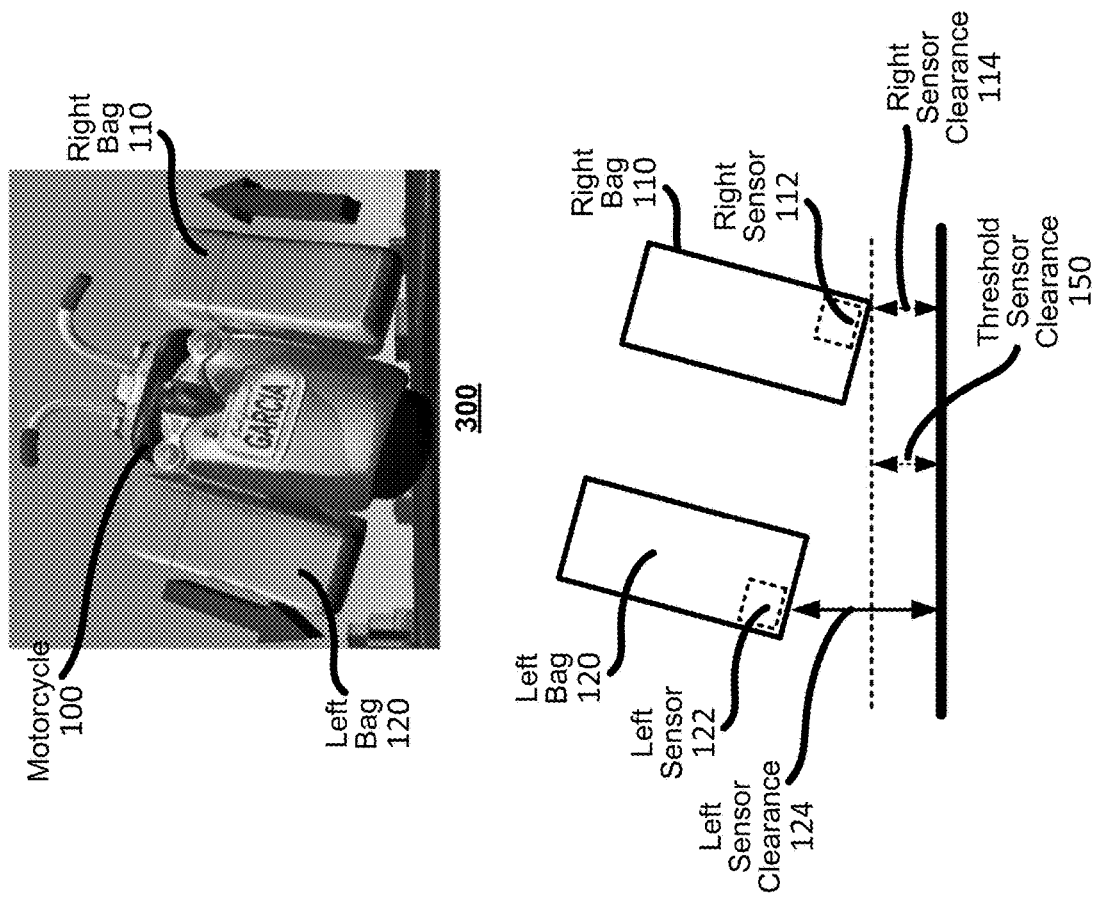
FIG. 16 illustrates exemplary sensor units of a motorcycle leaning to the right according to an aspect of the subject specification.
Figure 17:
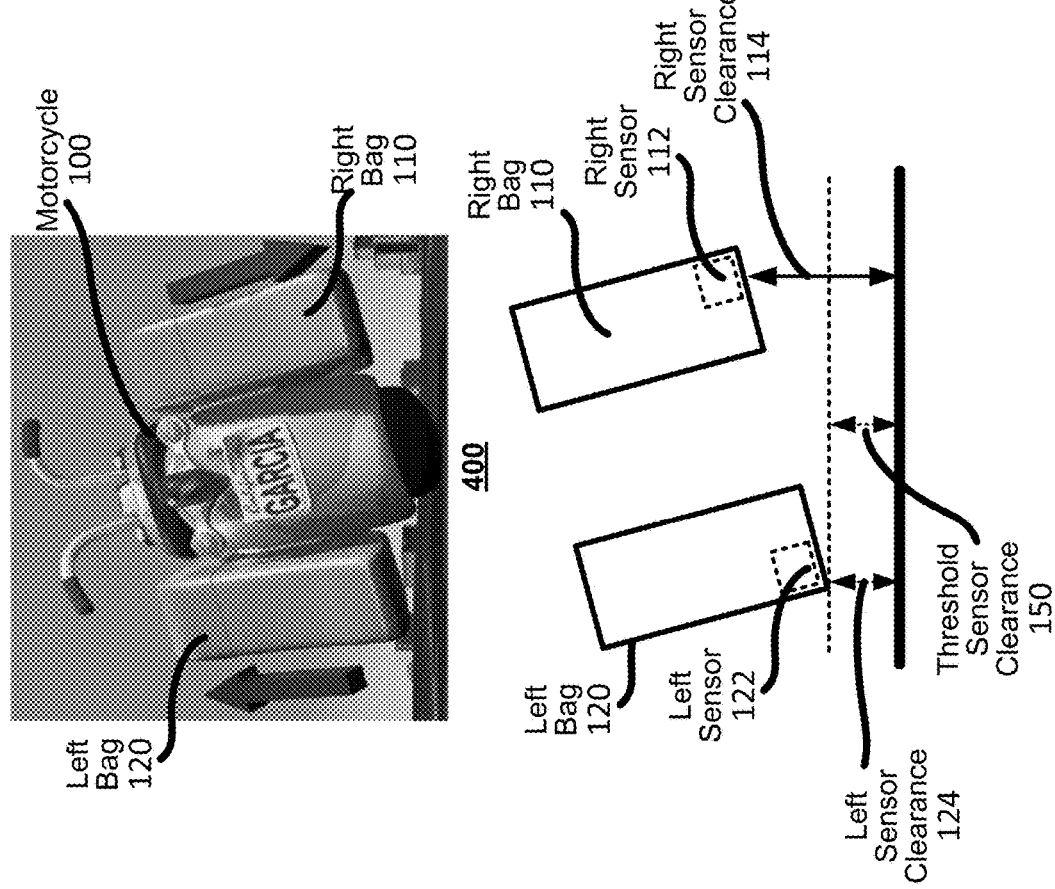
FIG. 17 illustrates exemplary sensor units of a motorcycle leaning to the left according to an aspect of the subject specification.

In another aspect, rather than utilizing accelerometer unit 140, sensors configured to sense a proximity to the road can be used to detect when motorcycle 100 is leaning towards a side. Exemplary sensors for such embodiment are illustrated in FIGS. 15-17 according to the views 200, 300, and 400 of motorcycle 100 in the various positions illustrated in FIGS. 12-14. For this particular embodiment, right bag 110 comprises right sensor 112, and left bag 120 comprises left sensor 122, as shown. Here, right sensor 112 is configured to detect when the right sensor clearance 114 is less than a threshold sensor clearance 150, whereas left sensor 122 is configured to detect when the left sensor clearance 124 is less than the threshold sensor clearance 150. In FIG. 15, for instance, motorcycle 100 is deemed to be in a leveled position, since neither the right sensor clearance 114 nor the left sensor clearance 124 are less than the threshold sensor clearance 150. While in a leveled position, it is again contemplated that each of right bag 110 and left bag 120 remain at a desired driving height from the road.

As motorcycle 100 is driven, it is contemplated that right sensor 112 and left sensor 122 will sense when a rider leans into a turn, and cause right bag 110 or left bag 120 to be raised accordingly. In FIG. 16, for instance, view 300 is shown in which motorcycle 100 leans to the right, wherein right bag 110 is raised in response to right sensor 112 detecting that the right sensor clearance 114 is less than the threshold sensor clearance 150. Similarly, FIG. 17 illustrates view 400 in which motorcycle 100 leans to the left, wherein left bag 120 is raised in response to left sensor 122 detecting that the left sensor clearance 124 is less than the threshold sensor clearance 150.

Figure 18:
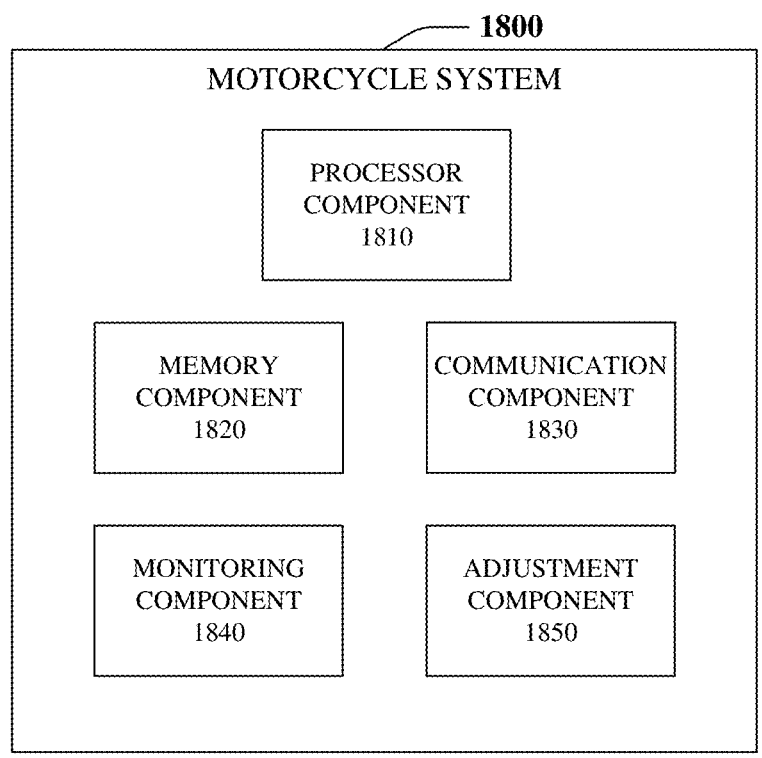
FIG. 18 illustrates a block diagram of an exemplary motorcycle system that facilitates implementing aspects disclosed herein.

In a further embodiment, it is contemplated that motorcycle 100 may be equipped with a computer-based system to facilitate implementing aspects disclosed herein. Referring next to FIG. 18, an exemplary block diagram of such a system is provided. As illustrated, motorcycle system 1800 may include a processor component 1810, a memory component 1820, a communication component 1830, a monitoring component 1840, and an adjustment component 1850. Components 1810-1840 may reside together in a single location or separately in different locations in various combinations, including, for example, a configuration in which at least one of the aforementioned components reside in a cloud.

In one aspect, processor component 1810 is configured to execute computer-readable instructions related to performing any of a plurality of functions. Processor component 1810 can be a single processor or a plurality of processors which analyze and/or generate information utilized by memory component 1820, communication component 1830, monitoring component 1840, and/or adjustment component 1850. Additionally or alternatively, processor component 1810 may be configured to control one or more components of motorcycle system 1800.

In another aspect, memory component 1820 is coupled to processor component 1810 and configured to store computer-readable instructions executed by processor component 1810. Memory component 1820 may also be configured to store any of a plurality of other types of data including data generated by any of communication component 1830, monitoring component 1840, and/or adjustment component 1850. Memory component 1820 may be configured to store any of several types of information explained above, including the saddlebags' desired driving/parking height, for example.

Memory component 1820 can be configured in a number of different configurations, including as random access memory, battery-backed memory, Solid State memory, hard disk, magnetic tape, etc. Various features can also be implemented upon memory component 1820, such as compression and automatic back up (e.g., use of a Redundant Array of Independent Drives configuration). In one aspect, the memory may be located on a network, such as a "cloud storage" solution.

Communication component 1830 may be used to interface motorcycle system 1800 with external entities. For example, communication component 1830 may be configured to receive and/or transmit data via a network (See e.g., FIG. 19). In a particular embodiment, communication component 1830 is configured to facilitate a communication with a remote unit, wherein an aspect of at least one of the monitoring component 1840 or the adjustment component 1850 is controlled by the communication. Moreover, it is contemplated that various aspects of motorcycle system 1800 may be controlled/monitored remotely (e.g., from a smartphone, laptop, etc.). Accordingly, it should be appreciated that communication component 1830 may be implemented using any of various communication protocols known in the art (e.g., Bluetooth, WiFi, etc.).

As illustrated, motorcycle system 1800 also includes monitoring component 1840 and adjustment component 1850. Here, it is contemplated that monitoring component 1840 is configured to monitor when a motorcycle's saddlebags should be raised/lowered, whereas adjustment component 1850 is configured to perform such adjustments. With respect to monitoring component 1840, any of various configurations are contemplated including, for example, an accelerometer unit or a sensory unit (See e.g., FIGS. 12-17). With respect to adjustment component 1850, various configurations are also contemplated including, for example, a motorized apparatus (e.g., the motorized apparatus illustrated in FIGS. 7-9), an air system (e.g., the air system illustrated in FIG. 10), or a hydraulic system (e.g., the hydraulic system illustrated in FIG. 11).

In a particular embodiment, motorcycle system 1800 is coupled to a motorcycle that includes a first saddlebag on a first side, and a second saddlebag on a second side. Within such embodiment, monitoring component 1840 is configured to monitor a tilt of the motorcycle to the first side, and further configured to monitor a tilt of the motorcycle to the second side. Adjustment component 1850 is then configured to lift the first saddlebag when the tilt of the motorcycle to the first side exceeds a tilt threshold, and further configured to lift the second saddlebag when the tilt of the motorcycle to the second side exceeds the tilt threshold.

In another aspect of the disclosure, adjustment component 1850 may be configured to facilitate toggling a motorcycle's saddlebags between a parking height and a driving height. For instance, adjustment component 1850 may be configured to lower at least one of the first saddlebag or the second saddlebag to a parking height, wherein the parking height is lower than a driving height. To further facilitate such embodiment, a bottom of at least one of the first saddlebag or the second saddlebag may comprise a protective liner (See e.g., FIGS. 5-6). In another embodiment, adjustment component 1850 is configured to automatically lower at least one of the first saddlebag or the second saddlebag from the driving height to the parking height when an ignition of the motorcycle is turned off, and also configured to automatically raise at least one of the first saddlebag or the second saddlebag from the parking height to the driving height when the ignition of the motorcycle is turned on.

Figure 19:
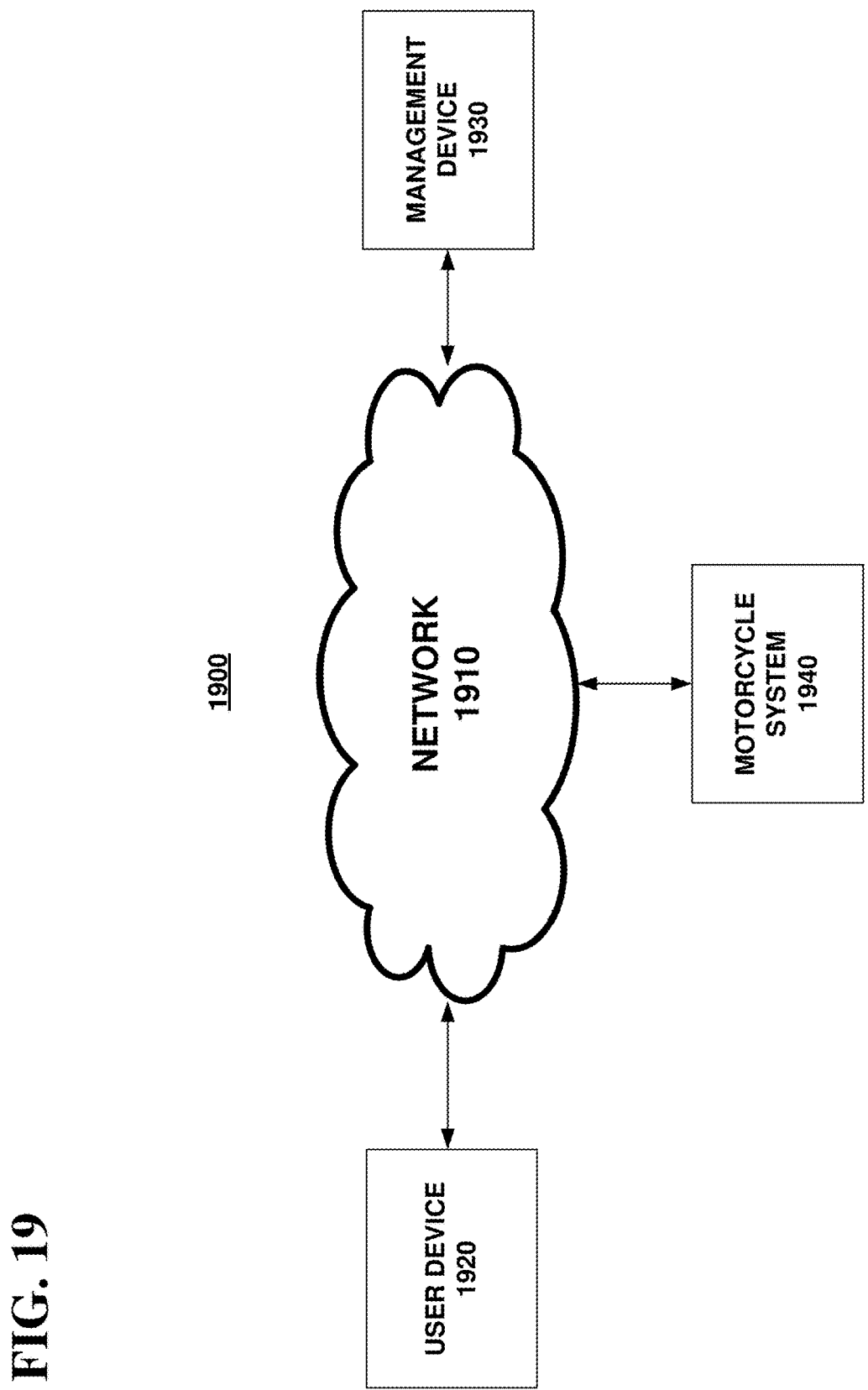
FIG. 19 illustrates an exemplary environment that facilitates adjusting motorcycle bags in accordance with an aspect of the subject specification.

Turning now to FIG. 19, an exemplary environment that facilitates adjusting motorcycle bags is provided according to an embodiment. As illustrated, environment 1900 includes user device 1920, which may be coupled to management device 1930 and motorcycle system 1940 via network 1910 (e.g., the Internet). Within such embodiment, it is contemplated that user device 1920 (e.g., a personal computer, mobile phone, tablet, etc.) is utilized by a motorcycle rider to communicate with motorcycle system 1940, wherein motorcycle system 1940 is substantially similar to motorcycle system 1800. Namely, it is contemplated that user device 1920 may be used to remotely control/monitor various aspects of motorcycle system 1940. For instance, user device 1920 may be used to remotely lower/raise a motorcycle's saddlebags while the motorcycle is parked, wherein such commands are received by the motorcycle system 1940 directly from the user device 1920 (e.g., via Bluetooth). Alternatively, a cloud-like architecture may be used in which commands from user device 1920 are transmitted to a centralized management device 1930 and subsequently forwarded to the motorcycle system 1940.

Figure 20:
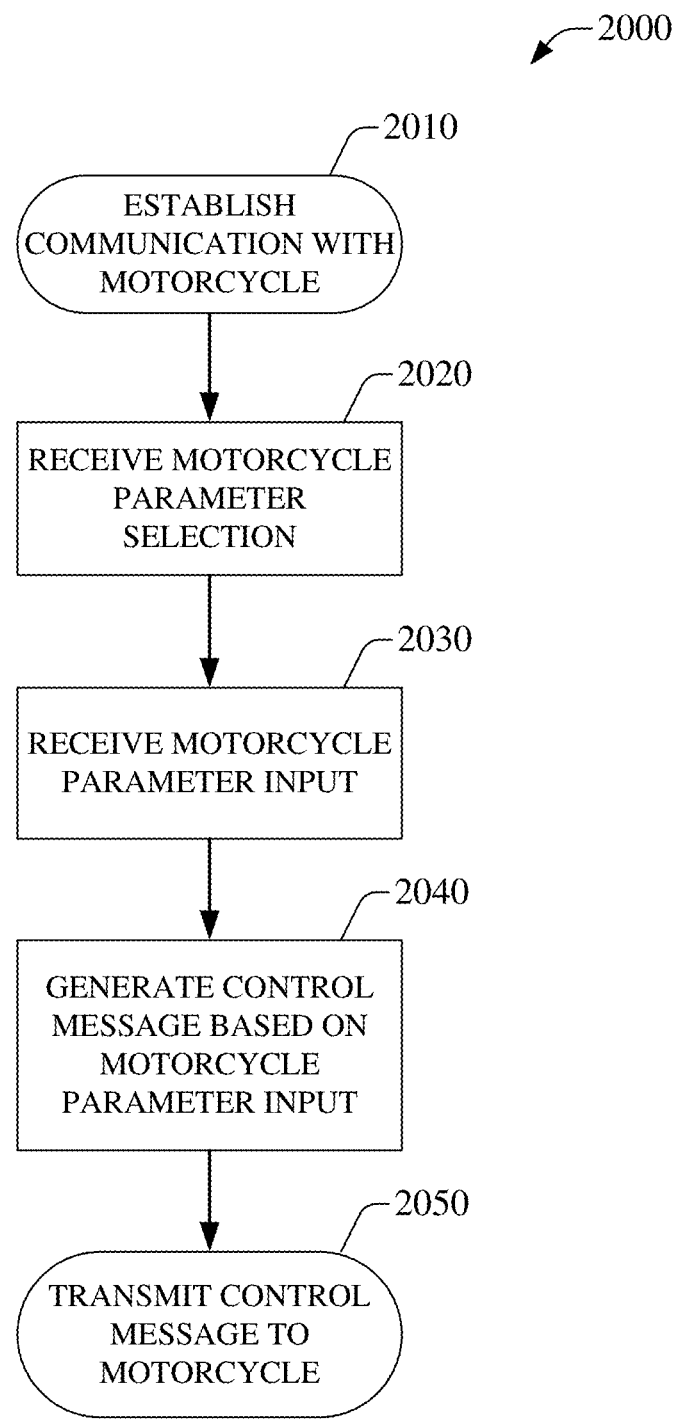
FIG. 20 is a flow diagram of an exemplary methodology that facilitates adjusting motorcycle bags in accordance with an aspect of the subject specification.

Referring next to FIG. 20, a flow chart illustrating an exemplary method that facilitates adjusting motorcycle bags according to an embodiment is provided. As illustrated, process 2000 includes a series of acts that may be performed by a motorcycle system that includes at least one computing device (e.g., user device 1920 or centralized management device 1930) according to an aspect of the subject specification. For instance, process 2000 may be implemented by employing a processor to execute computer executable instructions stored on a computer readable storage medium to implement the series of acts. In another embodiment, a computer-readable storage medium comprising code for causing at least one computer to implement the acts of process 2000 is contemplated.

In general, it should be appreciated that process 2000 facilitates a communication between a remote unit (e.g., user device 1920 or centralized management device 1930) and a motorcycle, and controls an aspect of at least one of a monitoring unit (e.g., monitoring component 1840) or a bag adjustment unit (e.g., adjustment component 1850) via the communication. As previously stated, it is contemplated that such motorcycle includes a first saddlebag on a first side, and a second saddlebag on a second side. Here, the monitoring unit may be configured to monitor a tilt of the motorcycle to the first side or the second side, whereas the bag adjustment unit may be configured to lift the first saddlebag when the tilt of the motorcycle to the first side exceeds a tilt threshold, and lift the second saddlebag when the tilt of the motorcycle to the second side exceeds the tilt threshold.

In a particular embodiment, however, process 2000 includes the various acts provided in FIG. 20. As illustrated, process 2000 begins with a remote unit establishing a communication with a motorcycle at act 2010. At act 2020, the remote unit then receives a motorcycle parameter selection from a user (e.g., driving height, parking height, etc.), followed by the remote unit receiving a particular input from the user at act 2030 corresponding to the motorcycle parameter selected at act 2020 (e.g., a driving height of five inches). Based on the input, the remote unit then generates a control message at act 2040, and process 2000 subsequently concludes with the remote unit transmitting the control message to the motorcycle at act 2050.

In a particular embodiment, it is thus contemplated that process 2000 may facilitate a calibration of a driving height. Moreover, it is contemplated that a communication from a remote unit to a motorcycle may comprise a calibration corresponding to a preferred driving height of the first saddlebag and the second saddlebag, wherein the bag adjustment unit of the motorcycle is configured to adjust a current driving height of the first saddlebag and the second saddlebag to the preferred driving height. In another embodiment, however, process 2000 facilitates a calibration of a parking height. Namely, it is contemplated that a communication from a remote unit to a motorcycle may comprise a calibration corresponding to a preferred parking height of the first saddlebag and the second saddlebag, wherein the bag adjustment unit of the motorcycle is configured to adjust a current parking height of the first saddlebag and the second saddlebag to the preferred parking height.

Exemplary Networked and Distributed Environments

One of ordinary skill in the art can appreciate that various embodiments for implementing the use of a computing device and related embodiments described herein can be implemented in connection with any computer or other client or server device, which can be deployed as part of a computer network or in a distributed computing environment, and can be connected to any kind of data store. Moreover, one of ordinary skill in the art will appreciate that such embodiments can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 21:
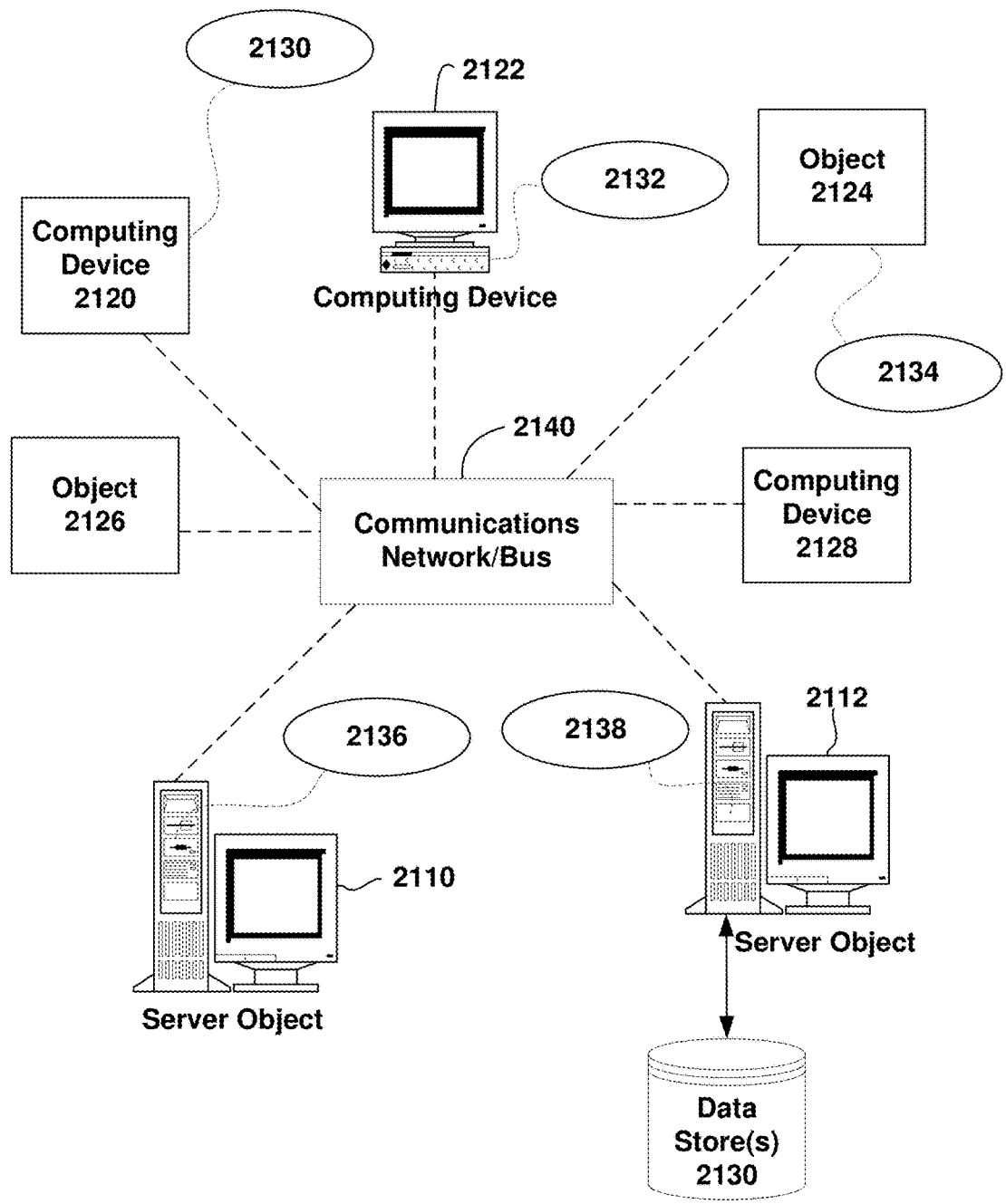
FIG. 21 is a block diagram representing exemplary non-limiting networked environments in which various embodiments described herein can be implemented.

FIG. 21 provides a non-limiting schematic diagram of an exemplary networked or distributed computing environment. The distributed computing environment comprises computing objects or devices 2110, 2112, etc. and computing objects or devices 2120, 2122, 2124, 2126, 2128, etc., which may include programs, methods, data stores, programmable logic, etc., as represented by applications 2130, 2132, 2134, 2136, 2138. It can be appreciated that computing objects or devices 2110, 2112, etc. and computing objects or devices 2120, 2122, 2124, 2126, 2128, etc. may comprise different devices, such as PDAs (personal digital assistants), audio/video devices, mobile phones, MP3 players, laptops, etc.

Each computing object or device 2110, 2112, etc. and computing objects or devices 2120, 2122, 2124, 2126, 2128, etc. can communicate with one or more other computing objects or devices 2110, 2112, etc. and computing objects or devices 2120, 2122, 2124, 2126, 2128, etc. by way of the communications network 2140, either directly or indirectly. Even though illustrated as a single element in FIG. 21, network 2140 may comprise other computing objects and computing devices that provide services to the system of FIG. 21, and/or may represent multiple interconnected networks, which are not shown. Each computing object or device 2110, 2112, etc. or 2120, 2122, 2124, 2126, 2128, etc. can also contain an application, such as applications 2130, 2132, 2134, 2136, 2138, that might make use of an API (application programming interface), or other object, software, firmware and/or hardware, suitable for communication with or implementation of the disclosed aspects in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 21, as a non-limiting example, computing objects or devices 2120, 2122, 2124, 2126, 2128, etc. can be thought of as clients and computing objects or devices 2110, 2112, etc. can be thought of as servers where computing objects or devices 2110, 2112, etc. provide data services, such as receiving data from computing objects or devices 2120, 2122, 2124, 2126, 2128, etc., storing of data, processing of data, transmitting data to computing objects or devices 2120, 2122, 2124, 2126, 2128, etc., although any computer can be considered a client, a server, or both, depending on the circumstances. Any of these computing devices may be processing data, or requesting services or tasks that may implicate aspects and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 2140 is the Internet, for example, the computing objects or devices 2110, 2112, etc. can be Web servers with which the computing objects or devices 2120, 2122, 2124, 2126, 2128, etc. communicate via any of a number of known protocols, such as HTTP. As mentioned, computing objects or devices 2110, 2112, etc. may also serve as computing objects or devices 2120, 2122, 2124, 2126, 2128, etc., or vice versa, as may be characteristic of a distributed computing environment.

Exemplary Computing Device

As mentioned, several of the aforementioned embodiments apply to any device wherein it may be desirable to include a computing device to facilitate implementing the aspects disclosed herein. It is understood, therefore, that handheld, portable and other computing devices and computing objects of all kinds are contemplated for use in connection with the various embodiments described herein. Accordingly, the below general purpose remote computer described below in FIG. 22 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 22:
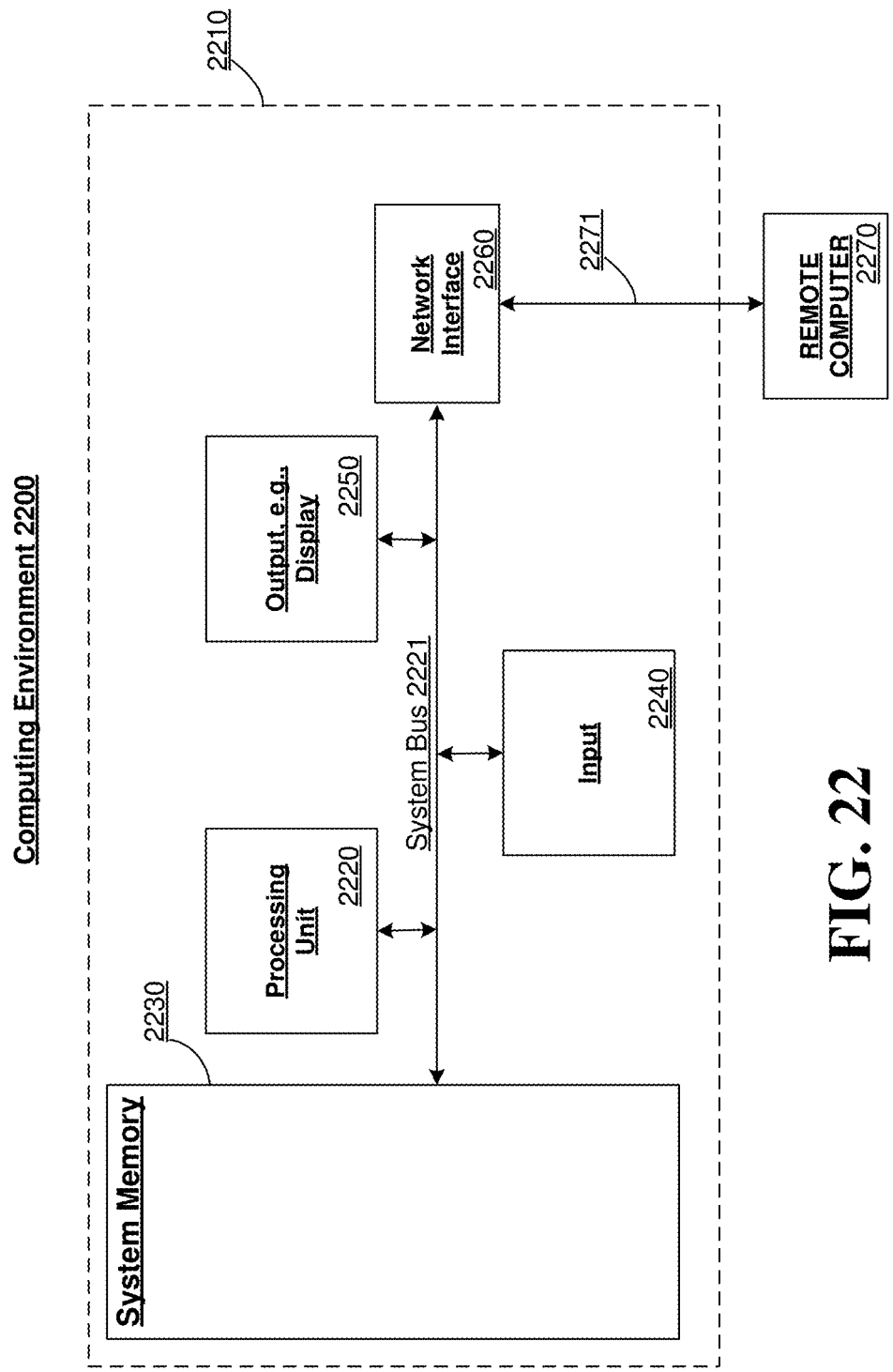
FIG. 22 is a block diagram representing an exemplary non-limiting computing system or operating environment in which one or more aspects of various embodiments described herein can be implemented.

FIG. 22 thus illustrates an example of a suitable computing system environment 2200 in which one or more of the embodiments may be implemented, although as made clear above, the computing system environment 2200 is only one example of a suitable computing environment and is not intended to suggest any limitation as to the scope of use or functionality of any of the embodiments. The computing environment 2200 is not to be interpreted as having any dependency or requirement relating to any one or combination of components illustrated in the exemplary operating environment 2200.

With reference to FIG. 22, an exemplary remote device for implementing one or more embodiments herein can include a general purpose computing device in the form of a handheld computer 2210. Components of handheld computer 2210 may include, but are not limited to, a processing unit 2220, a system memory 2230, and a system bus 2221 that couples various system components including the system memory to the processing unit 2220.

Computer 2210 typically includes a variety of computer readable media and can be any available media that can be accessed by computer 2210. The system memory 2230 may include computer storage media in the form of volatile and/or nonvolatile memory such as read only memory (ROM) and/or random access memory (RAM). By way of example, and not limitation, memory 2230 may also include an operating system, application programs, other program modules, and program data.

A user may enter commands and information into the computer 2210 through input devices 2240 A monitor or other type of display device is also connected to the system bus 2221 via an interface, such as output interface 2250. In addition to a monitor, computers may also include other peripheral output devices such as speakers and a printer, which may be connected through output interface 2250.

The computer 2210 may operate in a networked or distributed environment using logical connections to one or more other remote computers, such as remote computer 2270. The remote computer 2270 may be a personal computer, a server, a router, a network PC, a peer device or other common network node, or any other remote media consumption or transmission device, and may include any or all of the elements described above relative to the computer 2210. The logical connections depicted in FIG. 22 include a network 2271, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to implement the aspects disclosed herein.

There are multiple ways of implementing one or more of the embodiments described herein, e.g., an appropriate API, tool kit, driver code, operating system, control, standalone or downloadable software object, etc. which enables applications to implement the aspects disclosed herein. Embodiments may be contemplated from the standpoint of an API (or other software object), as well as from a software or hardware object that facilitates implementing the aspects disclosed herein in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment.

What is claimed is:

1. A motorcycle, comprising:
a first saddlebag on a first side of the motorcycle;
a second saddlebag on a second side of the motorcycle;
a monitoring unit configured to monitor a tilt of the motorcycle to the first side, and further configured to monitor a tilt of the motorcycle to the second side; and
a bag adjustment unit configured to lift the first saddlebag when the tilt of the motorcycle to the first side exceeds a tilt threshold, and further configured to lift the second saddlebag when the tilt of the motorcycle to the second side exceeds the tilt threshold.

2. The motorcycle of claim 1, wherein the monitoring unit comprises an accelerometer unit configured to monitor at least one of a tilt angle of the motorcycle to the first side or a tilt angle of the motorcycle to the second side, and wherein the tilt threshold corresponds to a tilt angle threshold.

3. The motorcycle of claim 1, wherein the monitoring unit comprises a sensor unit configured to monitor at least one of a first sensor clearance of the first saddlebag or a second sensor clearance of the second saddlebag, and wherein the tilt threshold corresponds to a threshold sensor clearance.

4. The motorcycle of claim 1, wherein the bag adjustment unit comprises a hydraulic system.

5. The motorcycle of claim 1, wherein the bag adjustment unit comprises an air system.

6. The motorcycle of claim 1, wherein the bag adjustment unit comprises a motorized system.

7. The motorcycle of claim 1, wherein the bag adjustment unit is configured to lower at least one of the first saddlebag or the second saddlebag to a parking height, and wherein the parking height is lower than a driving height.

8. The motorcycle of claim 7, wherein a bottom of at least one of the first saddlebag or the second saddlebag comprises a protective liner.

9. The motorcycle of claim 7, wherein the bag adjustment unit is configured to automatically lower at least one of the first saddlebag or the second saddlebag from the driving height to the parking height when an ignition of the motorcycle is turned off, and wherein the bag adjustment unit is configured to automatically raise at least one of the first saddlebag or the second saddlebag from the parking height to the driving height when the ignition of the motorcycle is turned on.

10. The motorcycle of claim 1, further comprising a communication component configured to facilitate a communication with a remote unit, wherein an aspect of at least one of the monitoring unit or the bag adjustment unit is controlled by the communication.

11. A method, comprising:
employing a processor to execute computer executable instructions stored on a computer readable storage medium to implement the following acts:
facilitating a communication between a remote unit and a motorcycle, wherein the motorcycle comprises:
a first saddlebag on a first side of the motorcycle;
a second saddlebag on a second side of the motorcycle;
a monitoring unit configured to monitor a tilt of the motorcycle to the first side, and further configured to monitor a tilt of the motorcycle to the second side; and
a bag adjustment unit configured to lift the first saddlebag when the tilt of the motorcycle to the first side exceeds a tilt threshold, and further configured to lift the second saddlebag when the tilt of the motorcycle to the second side exceeds the tilt threshold; and
controlling an aspect of at least one of the monitoring unit or the bag adjustment unit via the communication.

12. The method of claim 11, wherein the remote unit is a user device.

13. The method of claim 11, wherein the remote unit is a centralized management device.

14. The method of claim 11, wherein the communication comprises a calibration corresponding to a preferred driving height of the first saddlebag and the second saddlebag, and wherein the bag adjustment unit is configured to adjust a current driving height of the first saddlebag and the second saddlebag to the preferred driving height.

15. The method of claim 11, wherein the communication comprises a calibration corresponding to a preferred parking height of the first saddlebag and the second saddlebag, and wherein the bag adjustment unit is configured to adjust a current parking height of the first saddlebag and the second saddlebag to the preferred parking height.

16. A computer-readable storage medium, comprising:
a memory component configured to store computer-readable instructions, the computer-readable instructions including instructions for performing the following acts:
facilitating a communication between a remote unit and a motorcycle, wherein the motorcycle comprises:
a first saddlebag on a first side of the motorcycle;
a second saddlebag on a second side of the motorcycle;
a monitoring unit configured to monitor a tilt of the motorcycle to the first side, and further configured to monitor a tilt of the motorcycle to the second side; and
a bag adjustment unit configured to lift the first saddlebag when the tilt of the motorcycle to the first side exceeds a tilt threshold, and further configured to lift the second saddlebag when the tilt of the motorcycle to the second side exceeds the tilt threshold; and
controlling an aspect of at least one of the monitoring unit or the bag adjustment unit via the communication.

17. The computer-readable storage medium of claim 16, wherein the remote unit is a user device.

18. The computer-readable storage medium of claim 16, wherein the remote unit is a centralized management device.

19. The computer-readable storage medium of claim 16, wherein the communication comprises a calibration corresponding to a preferred driving height of the first saddlebag and the second saddlebag, and wherein the bag adjustment unit is configured to adjust a current driving height of the first saddlebag and the second saddlebag to the preferred driving height.

20. The computer-readable storage medium of claim 16, wherein the communication comprises a calibration corresponding to a preferred parking height of the first saddlebag and the second saddlebag, and wherein the bag adjustment unit is configured to adjust a current parking height of the first saddlebag and the second saddlebag to the preferred parking height.

* * * * *